R. T. FROST.
REBATE CARD.
APPLICATION FILED JAN. 16, 1918.
1,302,150.
Patented Apr. 29, 1919.
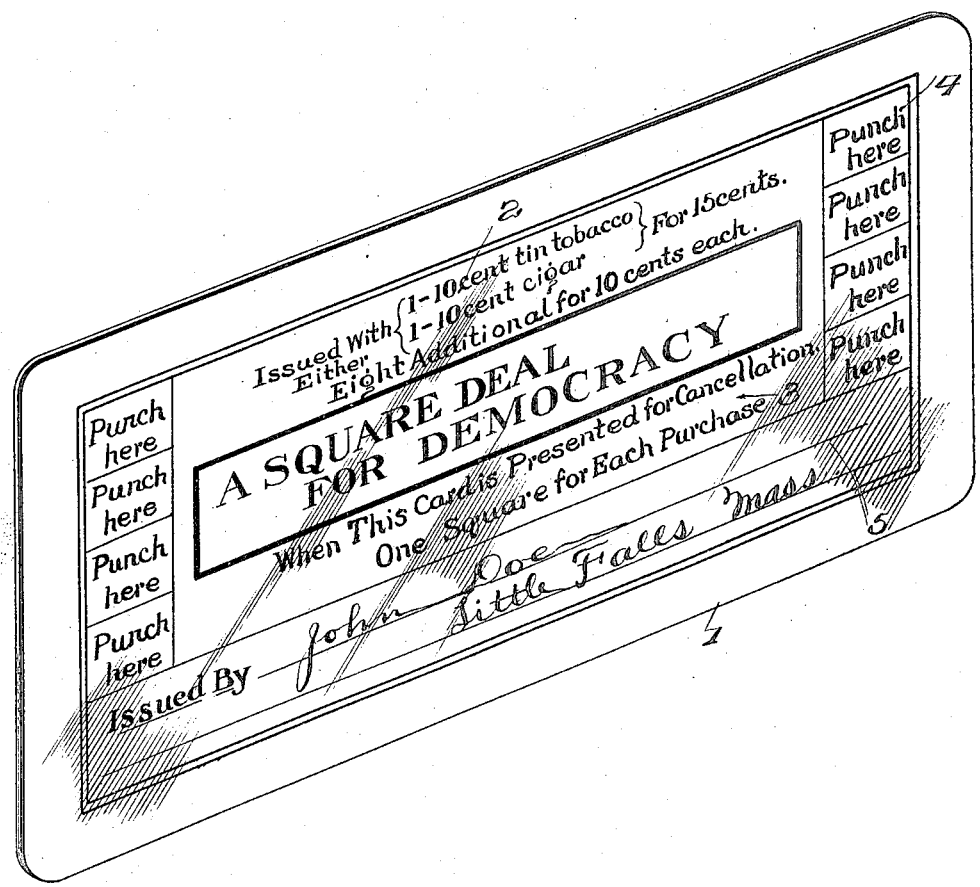
Inventor
R. T. Frost.
By _____, Attorney

UNITED STATES PATENT OFFICE.

ROBERT T. FROST, OF MINOT, NORTH DAKOTA, ASSIGNOR OF ONE-HALF TO ORRIN M. PIERCE, OF MINOT, NORTH DAKOTA.

REBATE-CARD.

1,302,150.    Specification of Letters Patent.    Patented Apr. 29, 1919.

Application filed January 16, 1918.   Serial No. 212,110.

*To all whom it may concern:*

Be it known that I, ROBERT T. FROST, a citizen of the United States, residing at Minot, in the county of Ward and State of North Dakota, have invented certain new and useful Improvements in Rebate-Cards, of which the following is a specification.

This invention relates to rebate cards and has as its object to provide a rebate card especially adapted for use in conjunction with the sale of tobacco, cigars, cigarettes, theater tickets, and in fact any article upon which is imposed a special war tax. The present war tax on tobacco, for example, is approximately four-tenths of one cent per ten cent tin. As the retailer's profit on tobacco is very small and as he could not himself afford to pay this tax out of his profits, he finds it necessary to charge an additional cent for each ten cent tin of tobacco and make a similar additional charge for cigars and cigarettes. As a result this creates an enormous demand for one cent pieces and considerable annoyance is caused in making change. Furthermore, it is the practice of some dealers to seize upon the war tax as an excuse for greatly increasing the selling price of tobacco, cigars and cigarettes, thereby making an unfair profit. These conditions, of course, attend the sale of theater tickets and various articles which are subject to the war tax. The present invention, therefore, aims to provide a rebate card by the use of which the necessity of making change in pennies is entirely obviated, the dealer is permitted to make the same profit on his goods as though the tax had not been imposed, and the purchaser of the goods is required to pay practically no more than the actual war tax.

A further aim of the invention is to provide a card for the purpose stated which in its use will bring increased sales to the dealer and which will also constitute a valuable advertising medium for his business.

The figure of the drawings illustrates the card embodying the present invention, and in the said figure the card, which is indicated by the numeral 1, is illustrated as having printed upon its face, as at 2, a statement to the effect that the card is issued with a certain commodity at a certain price, in the present instance, a ten-cent tin of tobacco or a ten-cent cigar at a price of fifteen-cents. This statement also sets forth the number of additional tins or cigars which may be purchased at a certain price, in the present instance eight additional tins or cigars at a price of ten cents each. The card may also bear upon its face, as indicated by the numeral 3, any suitable instructions as to cancellation of certain spaces upon its face. These cancellation spaces are indicated by the numeral 4 and are preferably arranged in vertical columns at each end of the card although any other suitable arrangement may be employed, and while each space in the present instance is in the form of a square, it will be understood, of course, that this space may have any other marginal configuration, or that the card may be provided with detachable coupons. In the present instance there are eight such spaces, corresponding to the number of additional tins or cigars referred to in the statement which is indicated by the numeral 2. There are also printed upon the face of the card lines 5 upon which may be written or printed the name and address of the dealer issuing the card.

As above stated the war tax is at present approximately four-tenths of one cent per ten-cent tin of tobacco or cigar so that the sum of five-cents will fully cover the war tax on nine tins of tobacco or nine ten cent cigars. In the use of the card embodying the invention, the dealer will issue one of the cards to a purchaser who pays fifteen-cents for a ten-cent tin of tobacco, a ten-cent cigar, a ten-cent package of cigarettes, or the like. The card states that eight additional tins, cigars or the like may be purchased at ten-cents each, and therefore when the purchaser desires to purchase another tin of tobacco or another cigar he will at the time of purchase present the card to the dealer with ten cents and the dealer will punch one of the spaces 4. Therefore, when all of the spaces have been canceled because of purchase of the designated number of tins of tobacco or cigars, the purchaser will have paid ninety-five cents for nine ten-cent tins of tobacco or nine ten-cent cigars. Consequently, while the purchaser has paid the war tax, he has, on the nine tins of tobacco paid four cents less than he would have paid had each tin been sold to him at a price of eleven-cents, and the dealer has received not only his full profit on the sale of the goods and an amount amply sufficient to cover the war tax, but in the meantime has had the benefit of the use of the card as an advertising medium. The dealer's name and address, as above stated, appears upon the face of the card and it will be understood that any desired advertising matter may be printed upon the reverse face of the card. A further advantage possessed by the card is that after a person has paid fifteen-cents in purchasing the initial tin of tobacco or cigar, he will be influenced to purchase eight additional tins of tobacco or cigars from the same dealer in order to avoid paying further war tax which other dealers would charge him on single purchases.

It will be understood, of course, that the statements upon the face of the card may be varied as also the number of punch spaces 4 in accordance with the selling price of the article referred to in such statement and the amount of war tax imposed thereon.

Having thus described the invention, what is claimed as new it:

1. A rebate card bearing upon its face a statement as to the selling price of an initial one of a number of articles and a statement as to the selling price of an additional number of such articles, the said card also bearing upon its face delineated spaces for cancellation corresponding in number to the number of additional articles mentioned upon the card.

2. A rebate card bearing upon its face a statement as to the selling price of an initial one of a number of articles and a statement as to the selling price of an additional number of such articles, the said card also bearing upon its face delineated spaces for cancellation corresponding in number to the number of additional articles mentioned upon the card, the said card also bearing upon its face a space to contain data identifying the person issuing the card.

3. A rebate card bearing upon its face a statement as to the selling price of an initial one of a number of articles and the selling price of a predetermined additional number of such articles, the card also bearing indicated spaces each of which is to be canceled upon the purchase of a single one of the articles, the indicated spaces corresponding in number to the predetermined additional number of articles indicated upon the face of the card, the said card also bearing upon its face a space to contain data identifying the person issuing the card.

In testimony whereof I affix my signature.

ROBERT T. FROST. [L.S.]

Copies of this patent may be obtained for five cents each, by addressing the "Commissioner of Patents, Washington, D. C."